United States Patent
Terwilliger et al.

(10) Patent No.: US 8,941,982 B2
(45) Date of Patent: *Jan. 27, 2015

(54) FRONT REMOVABLE COLD SWAP HARD DISK DRIVE CARRIER WITH INTERNAL RELEASE

(71) Applicant: Dell Products, LP, Round Rock, TX (US)

(72) Inventors: Kevin Terwilliger, Austin, TX (US); Hisham Beesheer, Austin, TX (US); Robert Moser, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/680,393

(22) Filed: Nov. 19, 2012

(65) Prior Publication Data

US 2013/0077231 A1   Mar. 28, 2013

Related U.S. Application Data

(63) Continuation of application No. 12/956,846, filed on Nov. 30, 2010, now Pat. No. 8,339,780.

(51) Int. Cl.
*G06F 1/16* (2006.01)
*H05K 5/00* (2006.01)
*H05K 7/00* (2006.01)
*G06F 1/18* (2006.01)
*G11B 33/12* (2006.01)

(52) U.S. Cl.
CPC  *G06F 1/16* (2013.01); *G06F 1/187* (2013.01); *G11B 33/122* (2013.01); *G11B 33/126* (2013.01); *G11B 33/128* (2013.01)
USPC ..................................... 361/679.33; 361/727

(58) Field of Classification Search
USPC .............................................. 361/679.3, 727
See application file for complete search history.

(56) References Cited

U.S. PATENT DOCUMENTS

| | | | |
|---|---|---|---|
| 4,817,079 A | 3/1989 | Covington | |
| 5,652,695 A | 7/1997 | Schmitt | |
| 6,407,913 B1 | 6/2002 | Peachey et al. | |
| 6,744,634 B2 | 6/2004 | Yen | |
| 7,088,579 B1 | 8/2006 | Konshak | |
| 2012/0134092 A1 | 5/2012 | Terwilliger et al. | |

*Primary Examiner* — Andargie M Aychillhum
(74) *Attorney, Agent, or Firm* — Larson Newman, LLP

(57) ABSTRACT

A connector for a disk drive unit includes a base, a curve portion, a tab, a support, a hook, and a first spring arm. The base has a left portion, a right portion, a bottom portion, and a top portion. The curve portion extends from a back of the top portion of the base. The tab is adapted to be inserted into a retention opening of a static wall of a server. The support extends substantially horizontally from an opposite end of the curve portion, and is adapted to flex up and down when the tab is inserted into the retention opening of the static wall of the server. The hook is physically connected between the support and the tab, and is adapted to flex the support when the hook pressed into contact with a top of the retention opening, and to snap fit around the top of the retention opening when the connector is completely inserted into the retention opening. The first spring arm extends toward a center and in front of the base, and is adapted to apply a force to the static wall when the hook is snap fitted around the top of the retention opening to secure the disk drive unit within the server.

20 Claims, 6 Drawing Sheets

FRONT REMOVABLE COLD SWAP HARD DISK DRIVE CARRIER WITH INTERNAL RELEASE

CROSS REFERENCE TO RELATED APPLICATIONS

This application is a continuation of U.S. patent application Ser. No. 12/956,846, entitled "Front Removable Cold Swap Hard Disk Drive Carrier with Internal Release," filed on Nov. 30, 2010, the disclosure of which is hereby expressly incorporated by reference in its entirety.

FIELD OF THE DISCLOSURE

This disclosure generally relates to information handling systems, and more particularly relates to a front removable cold swap hard disk drive carrier with internal release.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system such as a server can contain a number of hard disk drives. The hard disk drives may be either hot swap or cold swap hard disk drives that can be installed in the server via a hard disk driver carrier. The hot swap hard disk drives may be removed while power is provided to the server without experiencing data loss in the hot swap hard disk drives. However, cold swap hard disk drives preferably need the server to be powered down before they are removed to prevent data loss.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
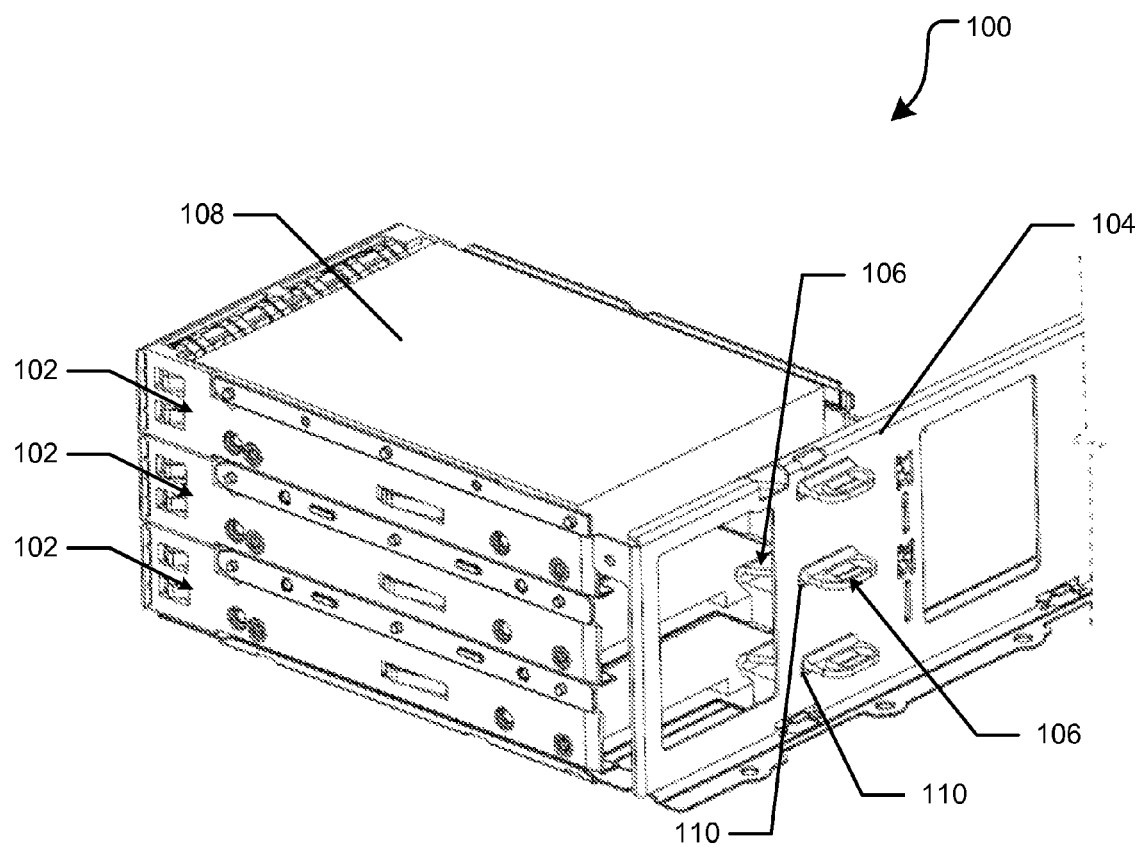
FIG. 1 is a rear perspective view of a plurality of disk drive units connected to a static wall of an information handling system.

FIG. 1 shows a server 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The server 100 includes a number of disk drive units 102 connected to a static wall 104 of the server via connectors 106. The disk drive unit 102 includes the connector 106 and a hard disk drive 108. The static wall 104 includes a number of retention openings 110 that the connectors 106 can be inserted into to connect the disk drive unit 102 to the static wall. The static wall 104 is located within the server 100, such that a user preferably powers down the server, and takes off a lid of the server before releasing the connector 106 from the retention opening 110. The disk drive unit 102 is preferably any cold swap disk drive that should be connected to or removed from the server 100 only when the server is powered down in order to avoid data loss. Thus, connection of the connector 106 to the static wall 104 inside the server 100 can prevent data loss in the hard disk drive 108 based on the server 100 and the hard disk drive being powered down before the disk drive unit 102 is removed from the server.

Figure 2:
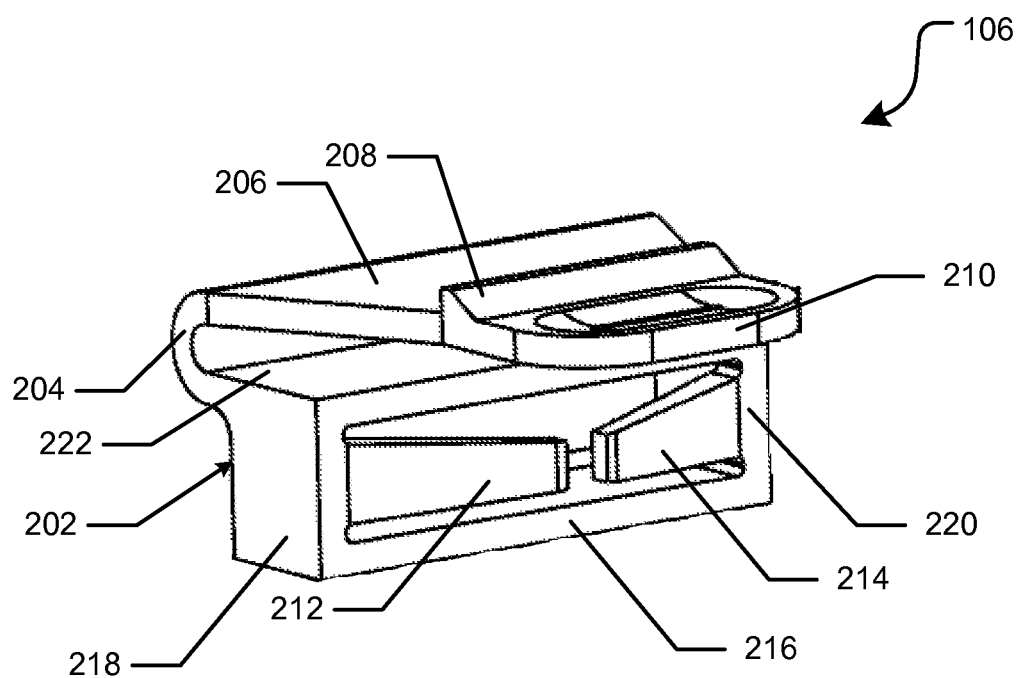
FIG. 2 is a front perspective view of a connector for the disk drive unit.
Figure 3:
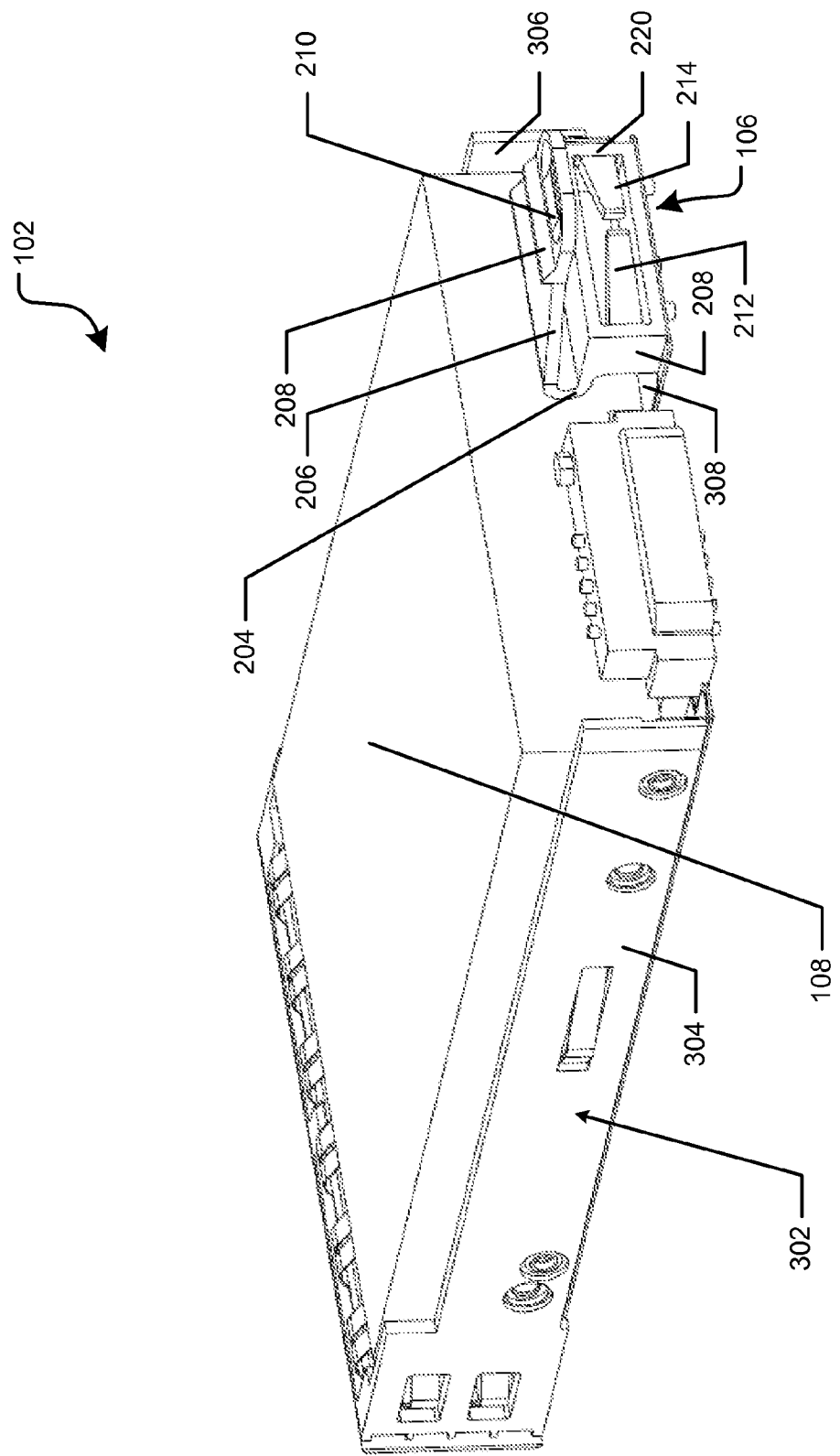
FIG. 3 is a rear perspective view of the disk drive unit including the connector.

FIGS. 2 and 3 show the connector 106 and the disk drive unit 102. The connector 106 includes a base 202, a curve portion 204, a support 206, a hook 208, a tab 210, and spring arms 212 and 214. The base 202 includes a bottom portion 216, a left portion 218, a right portion 220, and a top portion 222. The left portion 218 of the base extends between the left end of the bottom portion 216 and the left end of the top portion 222. Similarly, the right portion 218 of the base extends between the right end of the bottom portion 216 and the right end of the top portion 222. The curve portion 204 extends from the back of the top portion 222 of the base 202. The curve portion 204 can form a half circle or 'c' shape, such that the two ends of the curve portion are vertically in line with each other.

The support 206 can extend in a substantially horizontal direction from an end of the curve portion 204 opposite the top portion 222, such that the support is substantially parallel with the top portion. The hook 208 is connected between the tab 110 and a distal end of the support 206 opposite the curve portion 204. The spring arm 212 extends toward the center and slightly in front of the base 202 from the inside of the left portion 218 of the base. The spring arm 214 extends toward the center and slightly in front of the base 202 from the inside of the right portion 220 of the base.

The disk drive unit 102 includes a tray 302, a hard disk drive 108, and the connector 106. The tray 302 includes a left side 304, a right side 306, and a bottom 308. The hard disk drive 108 is in physical communication with the left side 304, with the right side 306, and with the bottom 308 of the tray 302. The connector 106 preferably extends up from the bottom 308 of the tray 302, and is preferably located behind the hard disk drive 108 such that the support 206 and the tab 210 extend away from the hard disk drive.

Figure 4:
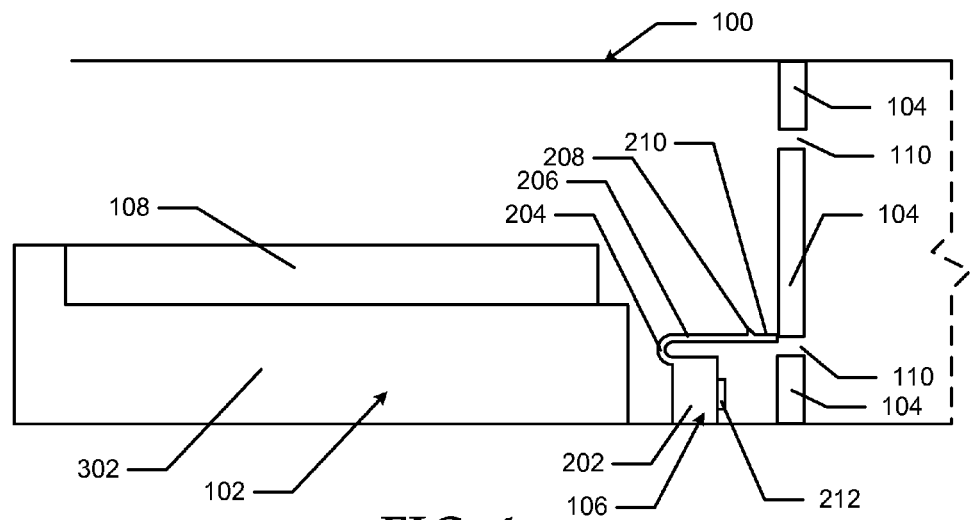
FIG. 4 is a side view of the disk drive unit, the connector, and the static wall in a first position.
Figure 5:
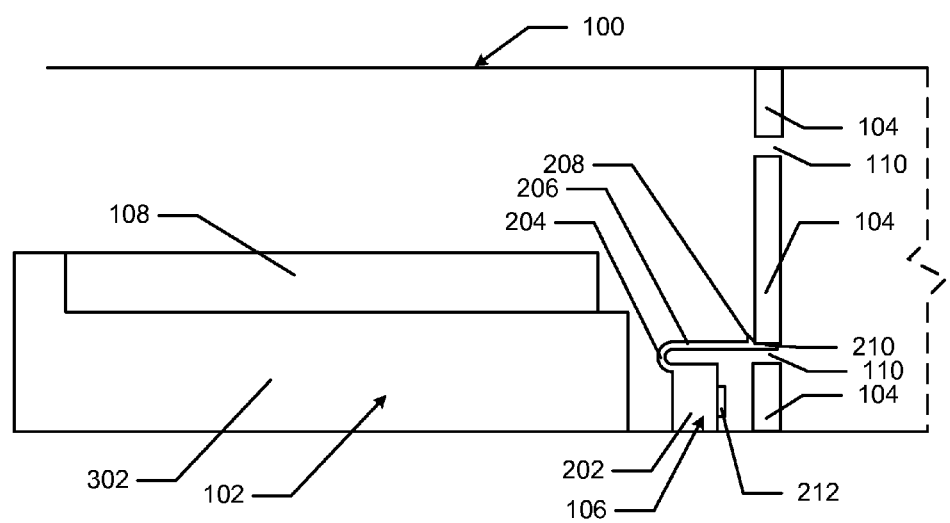
FIG. 5 is a side view of the disk drive unit, the connector, and the static wall in a second position.

FIG. 4 shows the disk drive unit 102 aligned within a bay of a server 100. The server 100 includes a static wall 104 having a number of retention openings 110. When the disk drive unit 102 is within the bay of the server 100, the connector 106 is preferably aligned with the retention opening 110 associated with the bay. As the disk drive unit 102 is inserted into the bay of the server 100, the tab 210 can slide into the retention opening 110 as shown in FIG. 5. As the tab 210 slides into the retention opening 110, the tab 210 either can be located slightly below the static wall 104, or can be in physical communication with the static wall.

Figure 6:
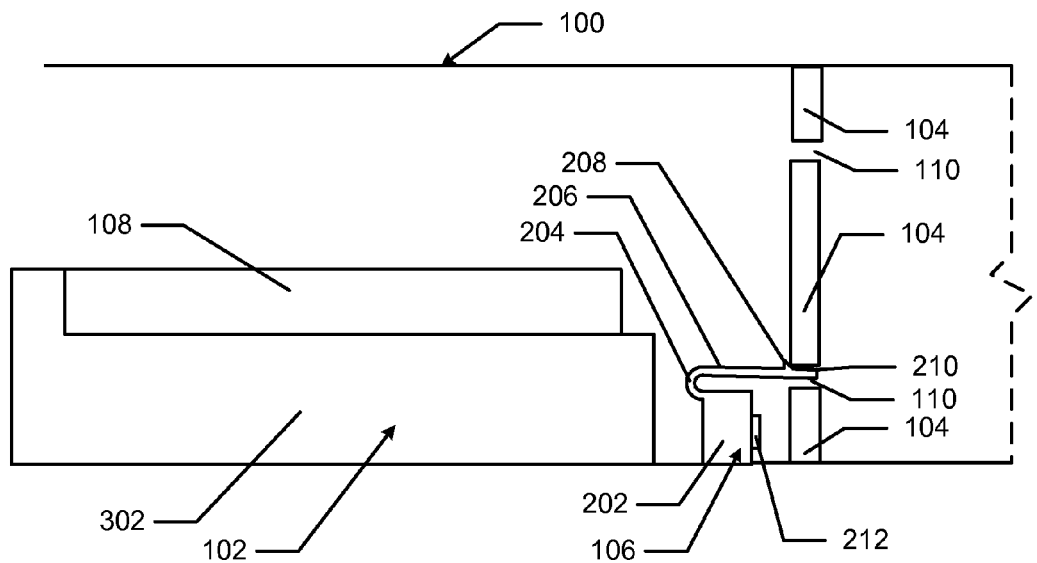
FIG. 6 is a side view of the disk drive unit, the connector, and the static wall in a third position.
Figure 7:
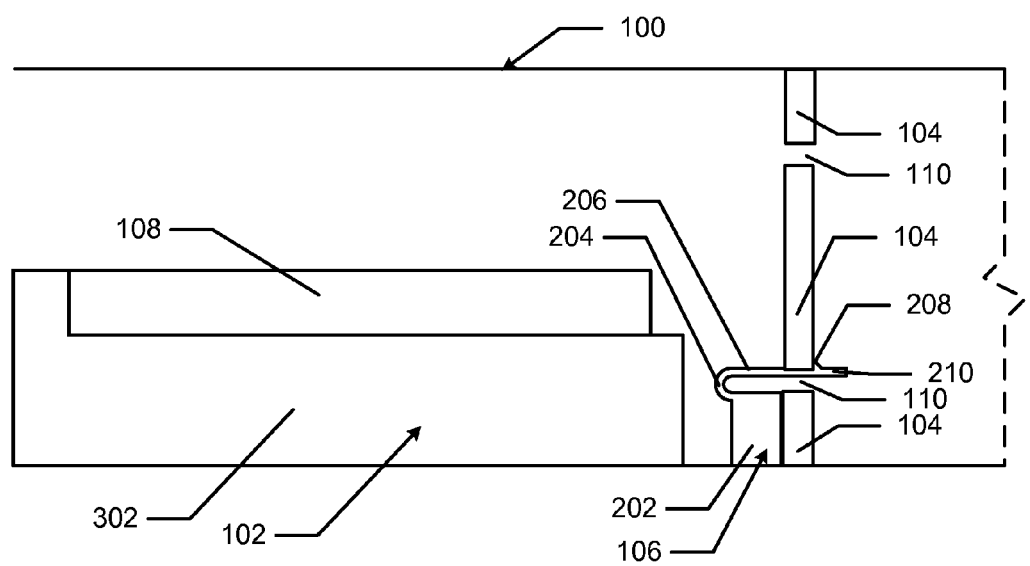
FIG. 7 is a side view of the disk drive unit, the connector, and the static wall in a fourth position.

As the disk drive unit 102 slides further into the bay of the server 100, the angled portion of the hook 208 provides a force on the support 206 to cause the support to flex away from the static wall 104 as shown in FIG. 6. The curve portion 204 can allow the support 206 to flex up and down to enable the support and the hook 208 to slide around a top of the retention opening 110. When the hook 208 slides beyond the static wall 104 that forms the top of the retention opening 110, the support 206 releases from the flexed position and the hook snap fits around the top of the retention opening as shown in FIG. 7. When the hook 208 snap fits around the top of the retention opening 110, the spring arms 212 and 214 can be forced within the left portion 218 and the right portion 220 of the base 202 by the static wall 104. While the spring arms 212 and 214 are within the base 202, the spring arms can exert a force on the static wall 104 so that the hook 208 is continuously held against the back side of the static wall. The force applied by the spring arms 212 and 214 to the static wall 104 can prevent vibrations created during the operation of the hard disk drive 108 from being transferred to other portions of the server 100.

To release the connector 106 from the retention opening 110 of the static wall 104, a downward force can be applied to the tab 210, such that the support 206 flexes away from the top of the retention opening. When the support 206 has flexed enough that the hook 208 is below the top of the retention opening 110, the spring arms 212 and 214 can exert a force against the static wall 104 to cause the disk drive unit 102 to slide away from the static wall. The force of the spring arms 212 and 214 can be such that when the hook 208 is removed from within the retention opening 110, the disk drive unit 102 returns to the position as shown in FIG. 5. From this position, the disk drive unit 102 can be pulled completely out of the bay of the server 100.

Figure 8:
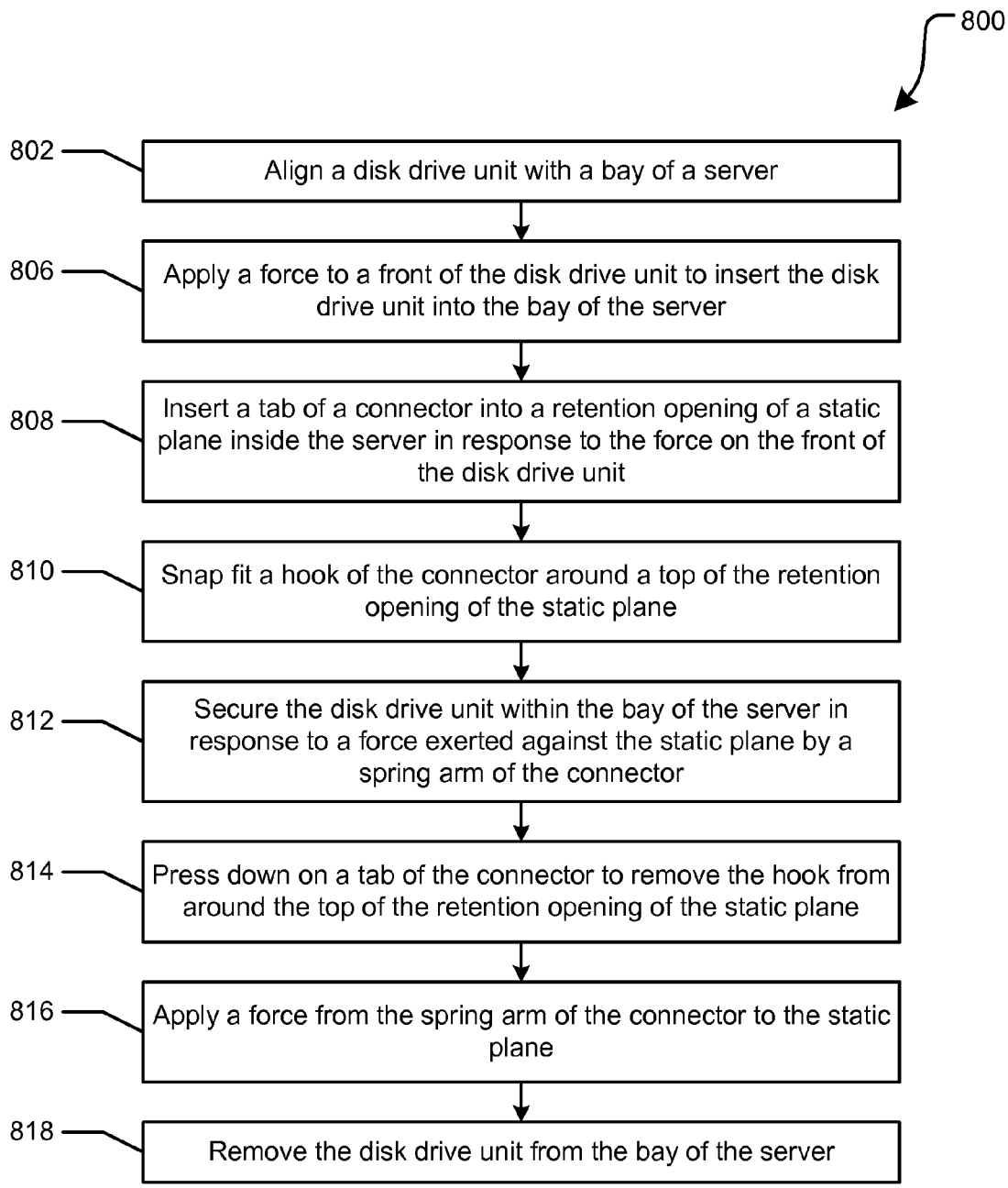
FIG. 8 is a flow diagram of a method for connecting the disk drive unit to the static wall via the connector.

FIG. 8 is a flow diagram of a method for connecting the cold swap drive to the static wall via the connector. At block 802, a disk drive unit is aligned with a bay of a server. A force is applied to a front of the disk drive unit to insert the disk drive unit into the bay of the server at block 804. At block 808, a tab of a connector is inserted into a retention opening of a static wall inside the server in response to the force on the front of the disk drive unit. A hook of the connector is snap fitted around a top of the retention opening at block 810.

At block 812, the disk drive unit is secured within the bay of the server in response to a force exerted against the static wall by a spring arm of the connector. A tab of the connector is pressed down to remove the hook from around the top of the retention opening at block 814. At block 816, a force is applied from the spring arm of the connector to the static wall. The disk drive unit is removed from the bay of the server at block 818.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A connector for a disk drive unit, the connector comprising:
    a support that extends from a base of the connector, and adapted to flex up and down in response to the connector being placed in physical contact with a retention opening of a static wall of a server;
    a hook physically connected to the support, the hook adapted to flex the support in response to the hook being pressed into contact with a top of the retention opening, and to snap fit around the top of the retention opening in response to the connector being completely inserted into the retention opening; and
    a first spring arm that extends toward a center and in front of the base, the first spring arm adapted to apply a force to the static wall when the hook is snap fitted around the top of the retention opening to secure the disk drive unit within the server.

2. The connector of claim 1 wherein the base includes a left portion, a right portion, a bottom portion, and a top portion, wherein the left portion extends between a left end of the bottom portion and a left end of the top portion, and the right portion extends between a right end of the bottom portion and a right end of the top portion.

3. The connector of claim 2 further comprising:
    a curve portion that extends from a back of the top portion of the base, wherein the curve portion is physically connected between the base and the support.

4. The connector of claim 2 further comprising:
a second spring arm that extends toward the center and in front of the base, the second spring arm adapted to apply a force to the static wall when the hook is snap fitted around the top of the retention opening to secure the disk drive unit within the server.

5. The connector of claim 4 wherein the first spring extends from an inside of the left portion of the base, and the second spring arm extends from an inside of the right portion of the base.

6. The connector of claim 1 further comprising:
a tab physically connected to an opposite side of the hook than the support, the tab adapted to be inserted into a retention opening of a static wall of a server.

7. A disk drive unit comprising:
a tray;
a hard disk drive in physical communication with the tray; and
a connector in physical communication with the tray, the connector including:
a support that extends from a base of the connector, and adapted to flex up and down in response to the connector being placed in physical contact with a retention opening of a static wall of a server;
a hook physically connected to the support, the hook adapted to flex the support in response to the hook being pressed into contact with a top of the retention opening, and to snap fit around the top of the retention opening in response to the connector being completely inserted into the retention opening; and
a first spring arm that extends toward a center and in front of the base, the first spring arm adapted to apply a force to the static wall when the hook is snap fitted around the top of the retention opening to secure the disk drive unit within the server.

8. The disk drive unit of claim 7 wherein the base includes a left portion, a right portion, a bottom portion, and a top portion, wherein the left portion extends between a left end of the bottom portion and a left end of the top portion, and the right portion extends between a right end of the bottom portion and a right end of the top portion.

9. The disk drive unit of claim 8 further comprising:
a curve portion that extends from a back of the top portion of the base, wherein the curve portion is physically connected between the base and the support.

10. The disk drive unit of claim 8 wherein the connector further comprises:
a second spring arm that extends toward the center and in front of the base, the second spring arm adapted to apply a force to the static wall when the hook is snap fitted around the top of the retention opening to secure the disk drive unit within the server.

11. The disk drive unit of claim 10 wherein the first spring extends from an inside of the left portion of the base, and the second spring arm extends from an inside of the right portion of the base.

12. The disk drive unit of claim 7 further comprising:
a tab physically connected to an opposite side of the hook than the support, the tab adapted to be inserted into a retention opening of a static wall of a server.

13. The disk drive unit of claim 7 wherein the hard disk drive is a disk drive unit.

14. An information handling system comprising:
a server including a static wall having a retention opening; and
a disk drive unit in communication with the server, the disk drive unit including:
a tray;
a hard disk drive in physical communication with the tray; and
a connector in physical communication with the tray, the connector
including:
a support that extends from a base of the connector, and adapted to flex up and down in response to the connector being placed in physical contact with a retention opening of a static wall of a server;
a hook physically connected to the support, the hook adapted to flex the support in response to the hook being pressed into contact with a top of the retention opening, and to snap fit around the top of the retention opening in response to the connector being completely inserted into the retention opening; and
a first spring arm that extends toward a center and in front of the base, the first spring arm adapted to apply a force to the static wall when the hook is snap fitted around the top of the retention opening to secure the disk drive unit within the server.

15. The information handling system of claim 14 wherein the base includes a left portion, a right portion, a bottom portion, and a top portion, wherein the left portion extends between a left end of the bottom portion and a left end of the top portion, and the right portion extends between a right end of the bottom portion and a right end of the top portion.

16. The information handling system of claim 15 further comprising:
a curve portion that extends from a back of the top portion of the base, wherein the curve portion is physically connected between the base and the support.

17. The information handling system of claim 15 wherein the connector further comprises:
a second spring arm that extends toward the center and in front of the base, the second spring arm adapted to apply a force to the static wall when the hook is snap fitted around the top of the retention opening to secure the disk drive unit within the server.

18. The information handling system of claim 17 wherein the first spring extends from an inside of the left portion of the base, and the second spring arm extends from an inside of the right portion of the base.

19. The information handling system of claim 14 further comprising
a tab physically connected to an opposite side of the hook than the support, the tab adapted to be inserted into a retention opening of a static wall of a server.

20. The information handling system of claim 14 wherein the hard disk drive is a disk drive unit.

* * * * *